(12) United States Patent
Tada

(10) Patent No.: US 7,396,993 B2
(45) Date of Patent: Jul. 8, 2008

(54) TRANSMISSION OF MIDI USING TCP AND UDP

(75) Inventor: Yukio Tada, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 574 days.

(21) Appl. No.: 11/051,811

(22) Filed: Feb. 4, 2005

(65) Prior Publication Data

US 2005/0172790 A1     Aug. 11, 2005

(30) Foreign Application Priority Data

Feb. 4, 2004    (JP) .............................. 2004-028411

(51) Int. Cl.
*G10H 7/00* (2006.01)

(52) U.S. Cl. ............................................ 84/645; 714/4

(58) Field of Classification Search ................... 84/645; 714/4
See application file for complete search history.

(56) References Cited

U.S. PATENT DOCUMENTS

| | | | |
|---|---|---|---|
| 5,734,119 A | | 3/1998 | France et al. |
| 5,883,957 A | * | 3/1999 | Moline et al. .................. 705/57 |
| 5,956,729 A | | 9/1999 | Goetz et al. |
| 5,977,468 A | * | 11/1999 | Fujii ............................ 84/609 |
| 6,359,877 B1 | | 3/2002 | Tathonyi et al. |
| 6,493,748 B1 | * | 12/2002 | Nakayama et al. ........... 709/218 |
| 6,898,729 B2 | * | 5/2005 | Virolainen et al. .............. 714/4 |
| 2003/0172797 A1 | * | 9/2003 | Juszkiewicz et al. .......... 84/601 |
| 2005/0002525 A1 | * | 1/2005 | Alkove et al. ................. 380/37 |

FOREIGN PATENT DOCUMENTS

CN        1319312 A        10/2001

OTHER PUBLICATIONS

John Lazzaro John Wawrzynek UC Berkeley: "An Implementation Guide to the MIDI Wire Protocol Packetization (MWPP)".
Lazzaro J et al.: "A Case for Network Musical Performance", International Workshop on Network and Operating System Supp., Jun. 25, 2001.
J. Lazzaro et al.; Internet URL: http://www.ietf.org/internet-drafts/draft-ietf-avt-rtp-midi-format-07.txt; "RTP Payload Format for MIDI"; Dec. 6, 2004; 176 pages.

* cited by examiner

*Primary Examiner*—Jeffrey Donels
(74) *Attorney, Agent, or Firm*—Harness, Dickey & Pierce, PLC

(57) ABSTRACT

As the protocol used to transmit the MIDI message, TCP and UDP used widely as the transmission protocol are employed. A player terminal on the transmitter side classifies the transmitted MIDI message into the system exclusive message that should never be lost absolutely and other MIDI message. The player terminal on the transmitter side transmits the system exclusive message by using TCP with high reliability and transmits other MIDI message by using UDP with low reliability.

12 Claims, 10 Drawing Sheets

<MULTI PORT; TCP CASE>

SAME IN THE OPPOSITE DIRECTION

<SINGLE PORT; TCP CASE>

TRANSMISSION OF MIDI USING TCP AND UDP

BACKGROUND OF THE INVENTION

The present invention relates to a communication terminal and, more particularly, a communication terminal for transmitting/receiving musical sound control data via a communication network such as the Internet, or the like.

FIG. 15 is a view exemplifying a connection state between electronic musical instruments, devices, etc. conforming to the MIDI (Musical Instrument Digital Interface) standard (referred to as "MIDI devices" hereinafter). Respective MIDI devices are connected via a MIDI cable, and a MIDI message (musical sound control data) generated in one MIDI device is transmitted to the other MIDI device via the MIDI cable.

In this manner, it is normal that the MIDI message is transmitted/received via the MIDI cable. In recent years in which the communication networks have been developed, a demand for implementation of duet performance or ensemble (session) by transmitting/receiving the MIDI message via the Internet is growing.

However, lack of the MIDI message, and the like are not assumed in advance in the existing transmission system. As a result, such a problem arises that, even though the existing transmission system is applied as it is to the Internet transmission that is apt to cause the transmission error, etc., the performance cannot be faithfully reproduced because of generation of the lack of the MIDI message, etc.

In view of such circumstances, an RTP Payload Format for MIDI standard is created in IETF (Internet Engineering Task Force) (for example, see Non-Patent Literature 1). This RTP Payload Format for MIDI is applied to transmit the MIDI message via a packet transmission network such as the Internet, or the like, and has features such that the data transmission with high reliability can be realized with great efficiency.

Non-Patent Literature 1

Internet URL: http://www.ietf.org/internet-drafts/draft-ietf-avt-rtp-midi-format-07.txt (online) (Feb. 3, 2005 search)

However, in order to execute the transmission based on this RTP Payload Format for MIDI standard, not only TCP (Transmission Control Protocol) and UDP (User Datagram Protocol), which serve as the core of protocol groups in regarding to the Internet communication, but also protocols such as RTP (Real-Time Transport Protocol), RTCP (Real-Time Control Protocol), SDP (Session Description Protocol), etc., which must consume much resources (CPU resource, memory resource, etc.), (named generally as "rich protocols" hereinafter) must be installed into the MIDI device. Nevertheless, it is the present state that the platform such as the electronic musical instrument, or the like does not have enough room in the CPU resource, the memory resource, etc. to such an extent that the protocols such as RTP, RTCP, SDP, etc. can be installed.

SUMMARY OF THE INVENTION

The present invention has been made in view of the foregoing circumstances, and it is an object of the present invention to provide a communication terminal capable of transmitting/receiving MIDI message, etc. effectively via the Internet without implementation of rich protocols such as RTP, RTCP, SDP, and the like.

In order to solve the aforesaid object, the invention is characterized by having the following arrangement.

(1) A communication terminal into which a connection-oriented type protocol and a connectionless type protocol are incorporated, the communication terminal comprising:

an inputting unit that inputs musical sound control data;

a packet generator that classifies the input musical sound control data into first and second systems, respectively, and formulates the classified musical sound control data belonging to each first or second system into packets to generate musical sound control packets; and a transmitter that transmits the musical sound control packet belonging to the first system to a destination terminal by utilizing the connection-oriented type protocol, and transmits the musical sound control packet belonging to the second system to the destination terminal by utilizing the connectionless type protocol.

(2) The communication terminal according to (1), further comprising a first assigning unit that assigns a sequential number representing an order of transmission to all musical sound control packets that are transmitted by utilizing either the connection-oriented type protocol or the connectionless type protocol.

(3) The communication terminal according to (2), wherein the first assigning unit assigns a sequential number for identifying the musical sound control packet and a sequential number, assigned to a preceding musical sound control packet that has already been transmitted by utilizing the connection-oriented type protocol, to each musical sound control packet transmitted by utilizing the connectionless type protocol.

(4) The communication terminal according to (1), further comprising:

a second assigning unit that assigns history information representing a history of the musical sound control packets that are precedingly transmitted to the destination terminal by utilizing the connectionless type protocol, to each musical sound control packet transmitted by utilizing the connectionless type protocol.

(5) The communication terminal according to (2), further comprising:

a second assigning unit that assigns history information representing a history of the musical sound control packets that are precedingly transmitted to the destination terminal by utilizing the connectionless type protocol, to each musical sound control packet transmitted by utilizing the connectionless type protocol.

(6) The communication terminal according to (1), further comprising:

an empty packet generator that generates an empty packet that does not contain command contents; and a sensing unit that senses a generation timing of each musical sound control packet that is transmitted by utilizing the connectionless type protocol, wherein the transmitter transmits the empty packet generated by the empty packet generator to the destination terminal by utilizing the connectionless type protocol when the generation timing of the musical sound control packet is not sensed by the sensing unit within a predetermined threshold time.

(7) The communication terminal according to (1), wherein the packet generator formulates the musical sound control data, which meet setting conditions, out of the input musical sound control data into packets to generate the musical sound control packet.

(8) The communication terminal according to (1), wherein the connection-oriented type protocol includes TCP positioned in a transport layer, the connectionless type protocol includes UDP positioned in the transport layer, the musical sound control data includes a MIDI message, the musical sound control data belonging to the first or second system include a system exclusive message and other MIDI message, and the transmitter transmits the musical sound control packet, in which the system exclusive message is packed as a packet, to the destination terminal by utilizing the TCP and transmits the musical sound control packet, in which other MIDI message is packed as the packet, to the destination terminal by utilizing the UDP.

(9) A communication terminal into which a connection-oriented type protocol and a connectionless type protocol are incorporated, the communication terminal comprising:

a receiver that receives a musical sound control packet transmitted from a destination terminal by utilizing the connection-oriented type protocol and the musical sound control packet transmitted from the destination terminal by utilizing the connectionless type protocol; and a recovering unit that recovers the musical sound control packet transmitted by utilizing the connectionless type protocol, based on a sequential number representing an order of transmission assigned to all musical sound control packets transmitted by utilizing respective protocols and history information attached to the musical sound control packet transmitted by utilizing the connectionless type protocol.

(10) A method of communications between communication terminals using a connection-oriented type protocol and a connectionless type protocol, the method comprising:

inputting musical sound control data;

classifying the input musical sound control data into first and second systems, respectively;

formulating the classified musical sound control data belonging to each first or second system into packets to generate musical sound control packets;

transmitting the musical sound control packet belonging to the first system by utilizing the connection-oriented type protocol; and transmitting the musical sound control packet belonging to the second system by utilizing the connectionless type protocol.

(11) A computer readable recording medium storing a program that causes a computer running the program to execute a procedure according to the method of (10).

(12) A method of communications between communication terminals using a connection-oriented type protocol and a connectionless type protocol, the method comprising:

receiving a musical sound control packet by utilizing the connection-oriented type protocol and the musical sound control packet by utilizing the connectionless type protocol; and a recovering unit that recovers the musical sound control packet transmitted by utilizing the connectionless type protocol, based on a sequential number representing an order of transmission assigned to all musical sound control packets transmitted by utilizing respective protocols and history information attached to the musical sound control packet transmitted by utilizing the connectionless type protocol.

(13) A computer readable recording medium storing a program that causes a computer running the program to execute a procedure according to the method of (12).

As described above, according to the present invention, it is feasible to transmit/receive effectively the MIDI message, etc. via the Internet without employment of rich protocols such as RTP, SDP, and the like.

DETAILED DESCRIPTION OF PREFERRED EMBODIMENTS

A system that permits a plurality of users, who are situated at various locations, to hold a session in real time by transmitting/receiving the MIDI message via the Internet (referred to as an "i-Session system" hereinafter) will be explained hereinafter.

A. Present Embodiment

Figure 1:
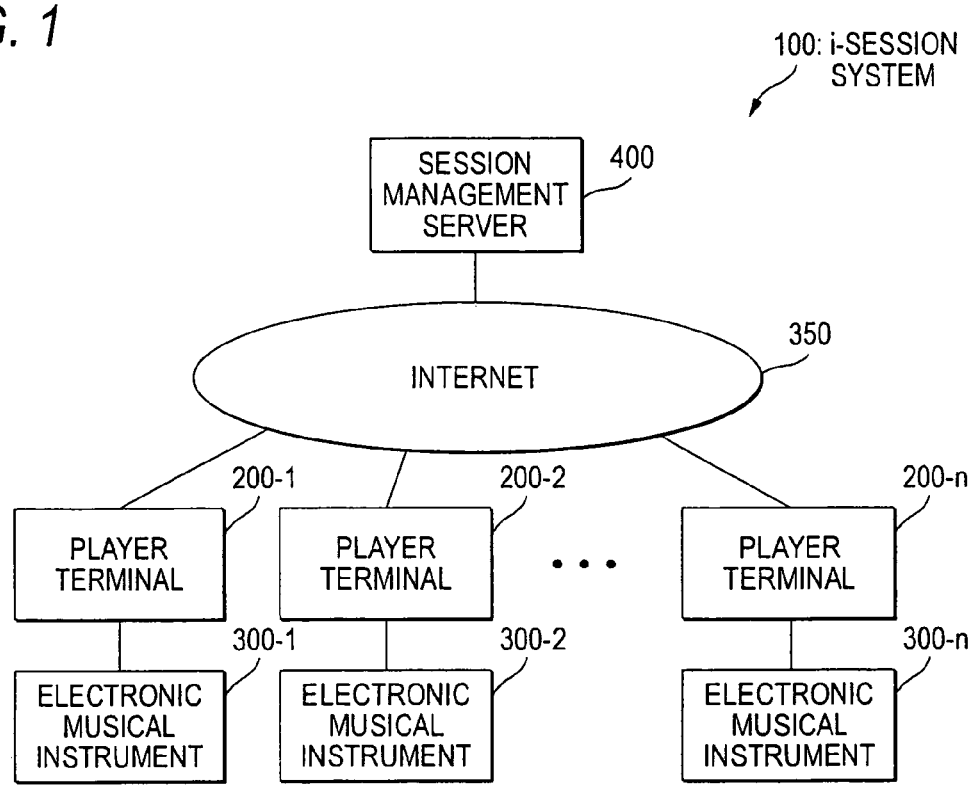
FIG. 1 is a view showing a configuration of an i-Session system according to a present embodiment.

FIG. 1 is a view showing a configuration of an i-Session system 100 according to a present embodiment.

The i-Session system 100 is constructed by a plurality of player terminals 200-$k$ ($1 \leq k \leq n$) connected via the Internet 350, electronic musical instruments 300-$k$ connected to respective player terminals 200-$k$, and a session management server 400. In this case, the player terminals 200-$k$ and the electronic musical instruments 300-$k$ are called simply the player terminals 200 and the electronic musical instruments 300 respectively if there is no necessity to discriminate them particularly.

The session management server 400 fulfills a role to manage pivotally the session that is implemented by the player terminals 200, and others. The electronic musical instrument 300 generates various MIDI messages in accordance with the playing operation executed by the user, and supplies the generated MIDI messages to the player terminal 200 as the connected destination.

The player terminal (communication terminal) 200 generates the MIDI packets (musical sound control packets) by formulating the MIDI messages supplied from the electronic musical instrument 300 into packets, and then transmits these packets to all the player terminals 200 that take part in the session. While, the player terminal 200 receives the MIDI packets transmitted from other player terminals 200, and then plays them. In the present embodiment, the case where the electronic musical instruments 300 and the player terminals 200 are prepared as a separate body respectively is supposed. But the electronic musical instrument 300 and the player terminal 200 may be constructed integrally by incorporating functions of the player terminal 200 into the electronic musical instrument 300, for example.

First Feature of i-Session System 100

Figure 2:
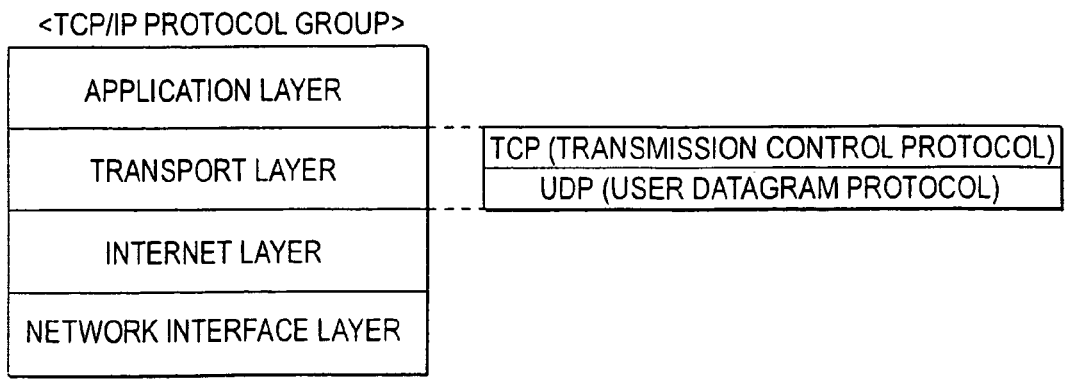
FIG. 2 is a view explaining a transmission protocol according to the embodiment.

FIG. 2 is a view explaining a transmission protocol used in the i-Session system 100. The i-Session system 100 according to the present embodiment transmits the MIDI packets by using TCP and UDP, which are widely used as the transmission protocol of the Internet 350, without use of the rich protocols such as RTP, SDP, and the like (see FIG. 2) Both TCP and UDP are the protocol that is positioned in the transport layer in the TCP/IP protocol group. Here, TCP is the protocol that has high reliability for the purpose of delivering the data without fail, and is called the connection-oriented type protocol because the sequence control, etc. are executed therein. In contrast, UDP is the protocol that has low reliability because no response is made to the lack of the packet, or the like in the transmission line, and is called the connectionless type protocol because the sequence control is not executed unlike TCP.

In the present embodiment, the MIDI messages are transmitted by using two-system transmission lines consisting of the TCP with high reliability and the UDP with low reliability. In more detail, the player terminal (transmitter) 200 first classifies the to-be-transmitted MIDI messages into the MIDI messages that should not become lost absolutely (in the present embodiment, the system exclusive messages) and other MIDI messages. According to such classification, the player terminal (transmitter) 200 transmits the system exclusive messages by using the TCP with high reliability and transmits other MIDI messages by using the UDP with low reliability.

Figure 3:
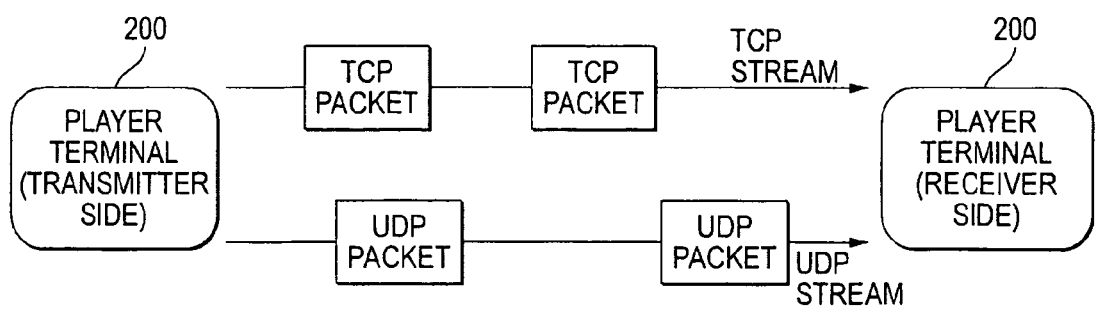
FIG. 3 is a view exemplifying TCP packets and UDP packets flowing through a TCP stream and an UDP stream according to the embodiment.

In the present embodiment, the case where only one type MIDI message (i.e., system exclusive message) out of various MIDI messages is transmitted by using TCP is exemplified. But the type, the number, etc. of the MIDI messages that are transmitted by using TCP may be appropriately varied in response to the application, etc. of the i-Session system 100. In the following explanation, the transmission line using TCP is called a TCP stream, and the MIDI message flowing through the TCP stream as the packet is called a TCP packet (see FIG. 3). Similarly, the transmission line using UDP is called a UDP stream, and the MIDI message flowing through the UDP stream as the packet is called a UDP packet (see FIG. 3).

Second Feature of i-Session System 100

Figure 4:
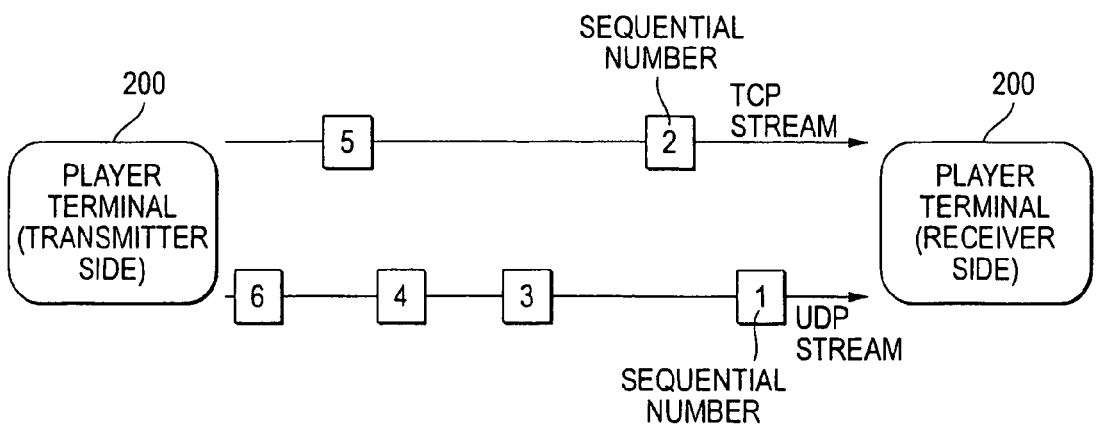
FIG. 4 is another view exemplifying TCP packets and UDP packets flowing through the TCP stream and the UDP stream according to the embodiment.

FIG. 4 is a view exemplifying TCP packets and UDP packets flowing through the TCP stream and the UDP stream.

In the present embodiment, as described above, the MIDI messages are transmitted as the packet by utilizing the TCP stream and the UDP stream (these are named generally as a "dual stream" hereinafter). Therefore, in order to play the MIDI messages correctly by the player terminal 200 on the receiver side, the packets flowing through each stream must be processed in proper order (i.e., in order of transmission). In the present embodiment, in order to attain this process, the unique sequential number indicating the order of transmission is assigned to all the packets flowing through the TCP stream and the UDP stream respectively, as shown in FIG. 4. The player terminal 200 on the receiver side can operate in synchronism with each other by processing respective packets in order-of the sequential number. In this case, because the UDP stream is the transmission line with low reliability as described above, such situations may be caused that the UDP packet becomes lost, the order of the UDP packets is transposed (the UDP packet transmitted later arrives at the player terminal 200 on the receiver side earlier than the UDP packet transmitted precedingly, or the like), and others. A third feature described in the following can deal with such situations.

Third Feature of i-Session System 100

Figure 5:
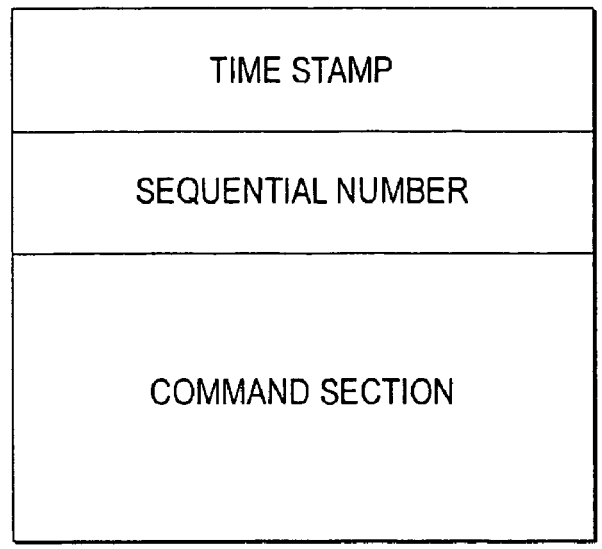
FIG. 5 is a view showing a configuration of the TCP packet according to the embodiment.
Figure 6:
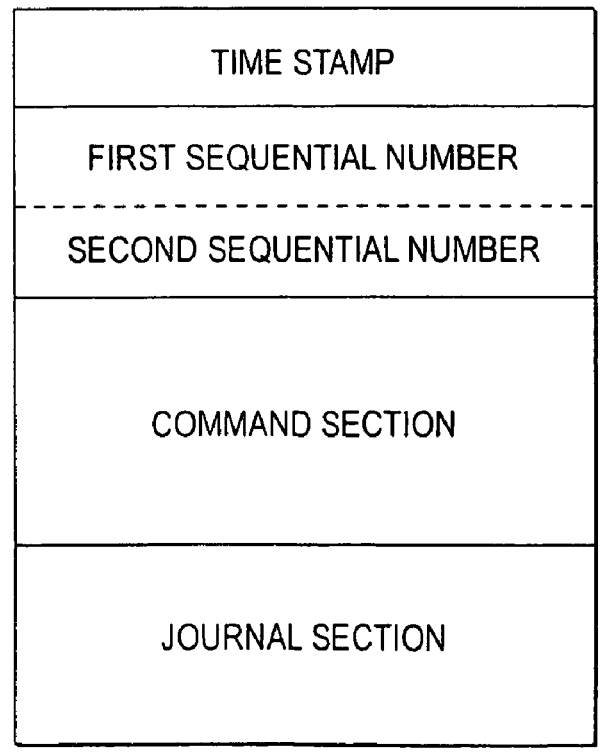
FIG. 6 is a view showing a configuration of the UDP packet according to the embodiment.

FIG. 5 is a view showing a configuration of the TCP packet flowing through the TCP stream, and FIG. 6 is a view showing a configuration of the UDP packet flowing through the UDP stream.

The TCP packet contains a time stamp, a sequential number, and a command section. While, the UDP packet contains a time stamp, a first sequential number, a second sequential number, a command section, and a journal section.

A timer value of an i-Session timer (not shown) is described as it is in the time stamps of the TCP packet and the UDP packet respectively.

The unique sequential number representing the order of transmission of the TCP packet is described in the sequential number of the TCP packet. Similarly, the unique sequential number representing the order of transmission of the UDP packet is described in the first sequential number of the UDP packet. In contrast, the sequential number of the preceding TCP packet that has already been transmitted is described in the second sequential number of the UDP packet. In this case, when the preceding TCP packet is not present (when none of the TCP packets has been transmitted yet), the sequential number "0" is described in the second sequential number of the UDP packet. By employing such configuration, it is possible to execute the recovery appropriately when the UDP packet is lost. This respect will be described later.

The command content representing the system exclusive message is described in the command section of the TCP packet. The command content representing the other MIDI message other than the system exclusive message is described in the command section of the UDP packet.

The journal section is provided in the UDP packet (see FIG. 6). History information required for the recovery from the packet loss, or the like and representing the history (command content, etc.) of the UDP packets transmitted until a point of that time (referred to as a "journal" hereinafter) is described in the journal section. This journal is a concept that is introduced in the above RTP Payload Format for MIDI, and is utilized to execute the recovery when the UDP packet is lost, and the like.

In this case, since the RTP Payload Format for MIDI and the i-Session system 100 are different in the packet transmitting system, the recovering method utilizing the journal is also different. In more detail, the RTP Payload Format for MIDI executes the packet transmission by utilizing only the UDP stream (i.e., single stream) whereas the i-Session system 100 executes the packet transmission by utilizing both the UDP stream and the TCP stream (dual stream). Therefore, the recovering method becomes different in both systems respectively. However, because the basic concept for respective recovering methods is common, first the recovering method in the single stream will be explained and then the recovering method in the dual stream will be explained.

Recovery Method in Single Stream

Figure 7:
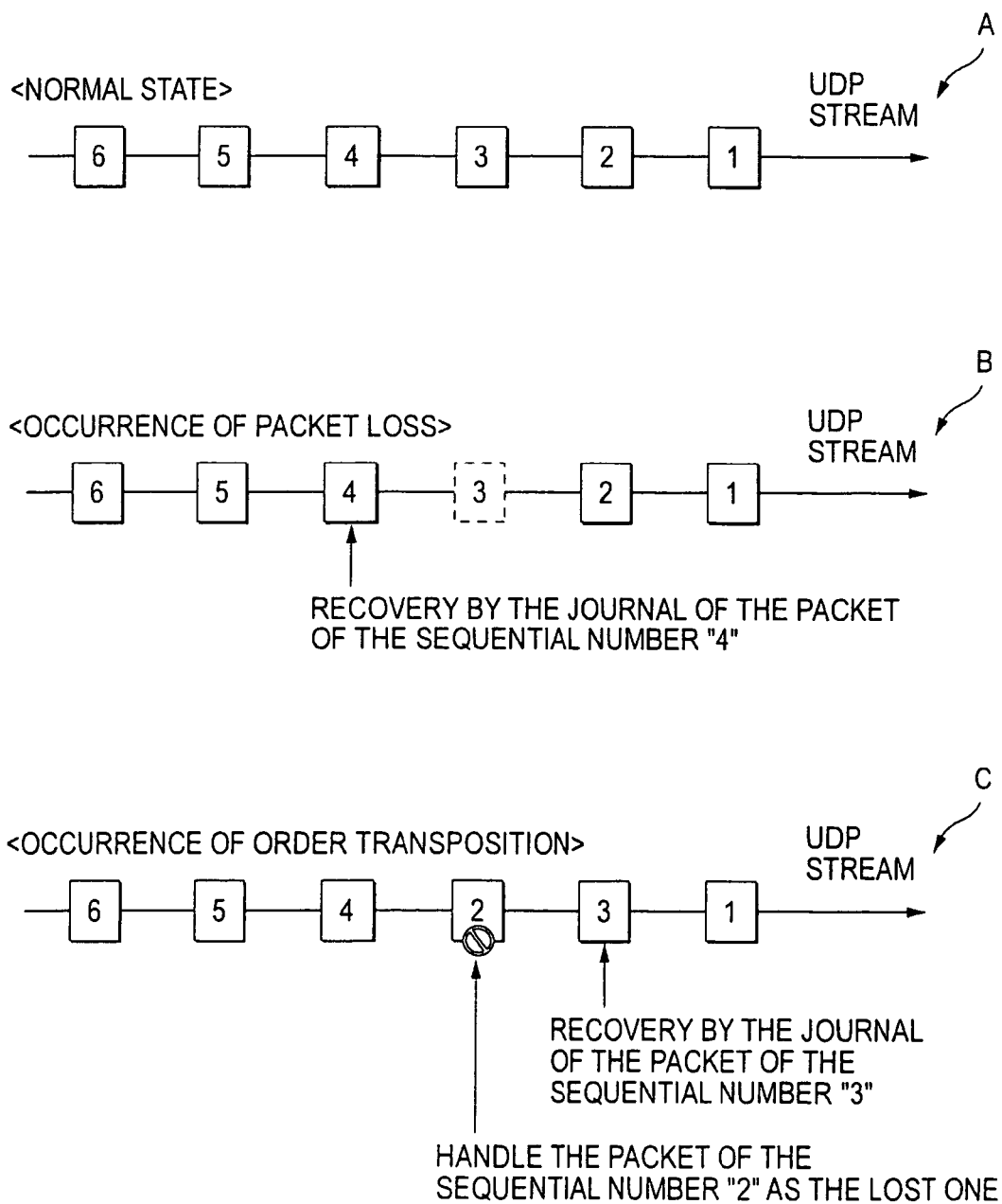
FIG. 7 is a view explaining a recovering method in a single stream according to the embodiment.

FIG. 7 is a view explaining the recovering method in the single stream. The sequential number representing the order of transmission as well as the journal representing the histories of the UDP packets transmitted from a start of the session to this point of time is attached to each UDP packet flowing through the UDP stream. Here, for example, as shown in A of FIG. 7, when all the UDP packets are flowing through the UDP stream in the normal state, the player terminal 200 on the receiver side can process properly all the UDP packets by referring to the sequential number assigned to each packet.

In contrast, as shown in B of FIG. 7, when a part of the UDP packet (sequential number "3") is lost, the player terminal 200 on the receiver side executes the recovery of the lost UDP packet by referring to the journal of the UDP packet (sequential number "4") that is received subsequently. More concretely, when the UDP packet of the sequential number "3" is lost in the middle of transmission, the player terminal 200 on the receiver side receives the UDP packet of the sequential number "4" after such terminal received the UDP packet of the sequential number "2" (see B of FIG. 7). The player terminal 200 on the receiver side decides that the packet of the sequential number "3" is lost because the sequential number of the received UDP packet skips from "2" to "4". Based on such decision, the player terminal 200 on the receiver side executes the recovering process of the lost UDP packet of the sequential number "3" by referring to the journal attached to the UDP packet of the sequential number "4".

For example, if the command "Damp the musical sound (C4, or the like) in operation" is contained in the lost UDP packet of the sequential number "3", the command content of the UDP packet of the sequential number "3" is contained in the journal of the UDP packet of the sequential number "4" (see the above explanation of the journal). If the player terminal 200 on the receiver side decides that the command "Damp the musical sound (C4, or the like) in operation" is contained in the UDP packet of the sequential number "3", by analyzing the journal of the UDP packet of the sequential number "4", such terminal damps the musical sound that is now generated based on the above command contents. The recovering process explained above may be applied similarly to not only the case where the UDP packet is lost but also the case where the order of the UDP packets is transposed.

For example, as shown in C of FIG. 7, when the order of the UDP packet of the sequential number "3" and the UDP packet of the sequential number "2" is transposed in the middle of transmission, the player terminal 200 on the receiver side decides that the UDP packet of the sequential number "2" is lost, at a point of time when such terminal received the UDP packet of the sequential number "3". The player terminal 200 on the receiver side executes the same recovering process as above based on such decision. In this manner, the UDP packet of the sequential number "2" is recovered by using the journal of the UDP packet of the sequential number "3". Therefore, even though the UDP packet of the sequential number "2" reaches later, such UDP packet of the sequential number "2" is abandoned (see C of FIG. 7).

In this case, if the journal attached to the UDP packet is identical to the journal attached to the preceding UDP packet (i.e., the command contents to be processed are not changed), the recovering process is not needed even though this UDP packet is lost. Such case may be handled by adding the information to the effect that the recovering process is not needed to the UDP packet in place of the attachment of the journal to the UDP packet.

Recovery Method in Dual Streams

Figure 8:
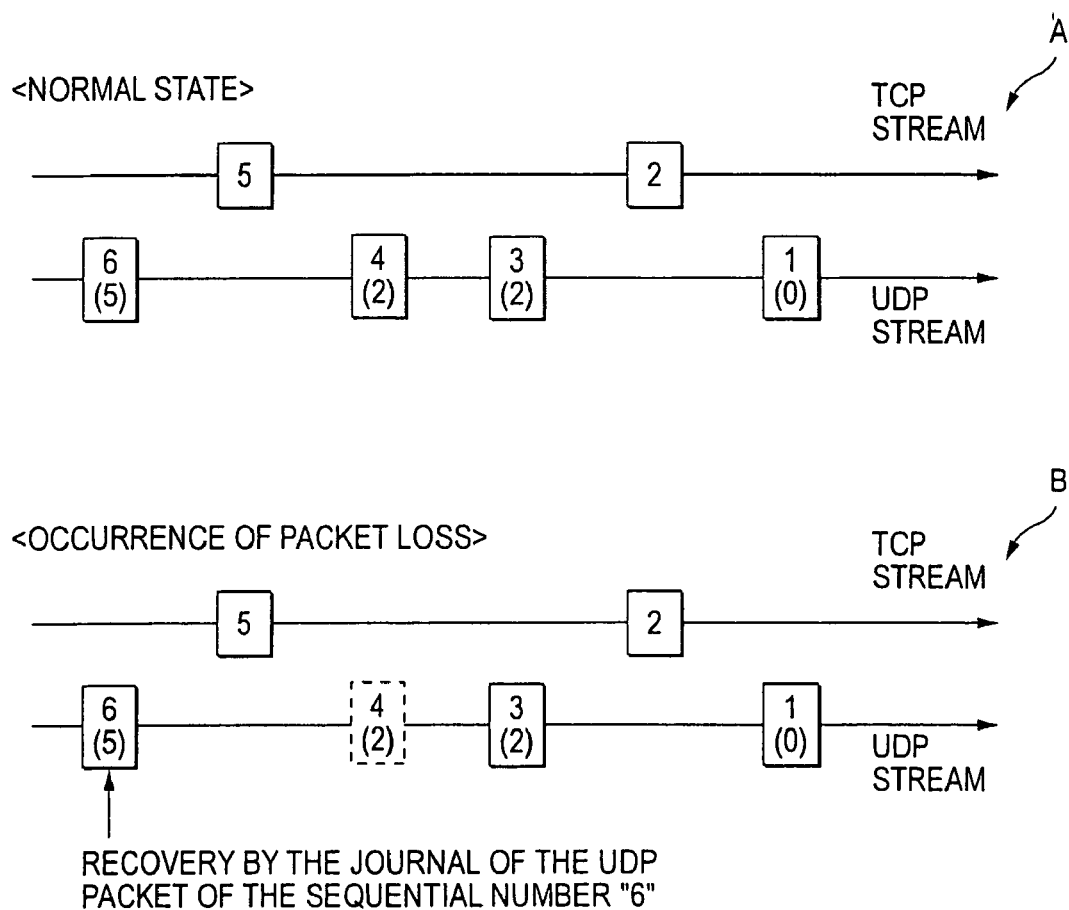
FIG. 8 is a view explaining a recovering method in a dual stream according to the embodiment.
Figure 9:
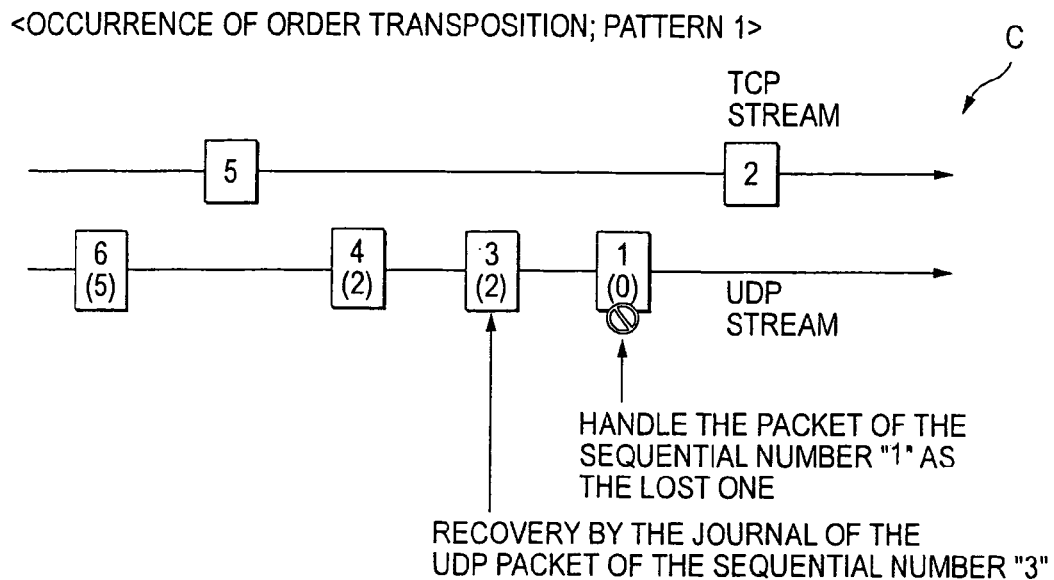
FIG. 9 is another view explaining a recovering method in the dual stream according to the embodiment.
Figure 9:
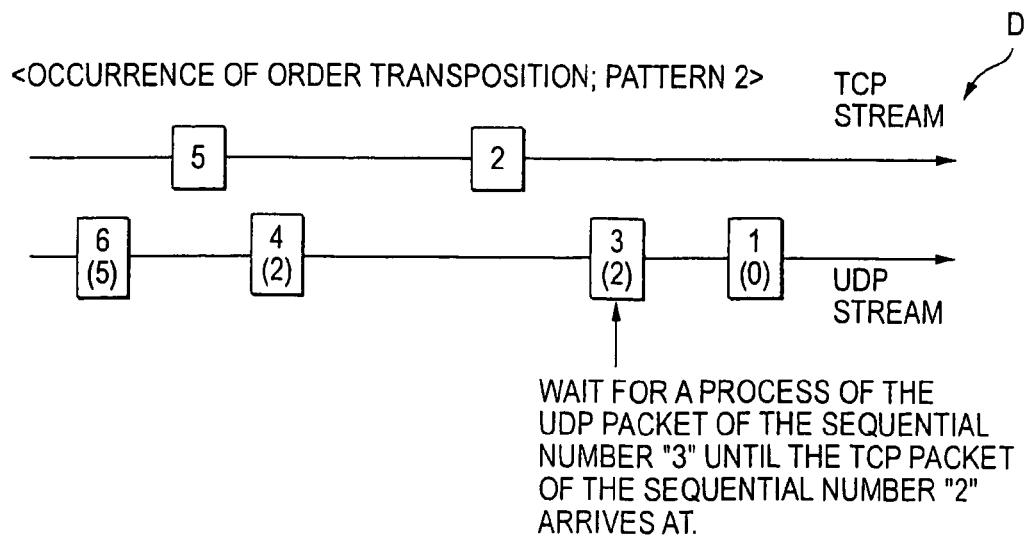

FIG. 8 and FIG. 9 are views explaining a recovering method in the dual stream and correspond to above FIG. 7.

The sequential number of the preceding TCP packet together with the above sequential number and the journal are attached to each UDP packet flowing through the UDP stream (see the numerical value put in parentheses in FIG. 8 and FIG. 9). For example, as shown in A of FIG. 8, the sequential number "2" of the preceding TCP packet is further assigned to respective UDP packets of the sequential numbers "3" and "4", while the sequential number "5" of the preceding TCP packet is further assigned to the UDP packet to which the sequential numbers "6" is assigned. In this case, in order to clarify the fact that the preceding TCP packet is not present, the sequential number "0" is further assigned to the UDP packet that does not have the preceding TCP packet (the UDP packet to which the sequential numbers "1" is assigned). When all the UDP packets are flowing through the UDP stream in the normal state in the dual stream environment, the player terminal 200 on the receiver side can process all the UDP packets normally by looking up the sequential number that is assigned to each packet, like the case in the single stream environment.

As shown in B of FIG. 8, when a part of the UDP packets is lost, the player terminal 200 on the receiver side executes the recovery of the lost UDP packet by looking up the journal of the UDP packet that is received subsequently, like the case in the single stream environment.

More particularly, as shown in B of FIG. 8, when the UDP packet of the sequential number "4" is lost, the player terminal 200 on the receiver side receives the UDP packet of the sequential number "6" after such terminal received the UDP packet of the sequential number "3". When the player terminal 200 on the receiver side decides that the UDP packet of the sequential number "4" is lost, based on the sequential number of the received UDP packet and the sequential number of the TCP packet, such terminal executes the recovery of the lost UDP packet of the sequential number "4" by referring to the journal that is attached to the UDP packet of the sequential number "6" (the journal representing the history of the UDP packets of the sequential numbers "1", "3", "4" in the present embodiment). Meanwhile, unlike the case in the single stream environment, the recovering process executed when the order of the packets is transposed will be executed as follows.

Pattern 1; Arrival of TCP Packet is Advanced

As shown in C of FIG. 9, when the packets arrive at the player terminal 200 on the receiver side in order of the TCP packet (the sequential number; "2")→the UDP packet (the sequential number; "1") due to the occurrence of the order transposition of the packets, the TCP packet that reached earlier is processed immediately as soon as such packet arrives at the terminal whereas the UDP packet that reached late (the sequential number; "1") is handled as the lost one. The recovery of the UDP packet that is handled as the lost one is executed by using the journal of the UDP packet that arrived at subsequently (the sequential number; "3").

Pattern 2; Arrival of TCP Packet is Delayed

As shown in D of FIG. 9, when the packets arrive at the player terminal 200 on the receiver side in order of the UDP packet (the sequential number; "3")→the TCP packet (the sequential number; "2") due to the occurrence of the order transposition of the packets, the UDP packet that reached earlier is saved temporarily in a buffer, or the like and the process is not started until the TCP packet that is delayed arrives at the terminal. As described above, in order to decide whether or not the arrival of the TCP Packet is delayed, the sequential number of the preceding TCP packet that should be processed earlier than the concerned packet is added to each UDP packet. The player terminal 200 on the receiver side decides whether or not the process of the concerned UDP packet should be delayed, by referring to the sequential number of the preceding TCP packet that is added to the concerned UDP packet. When the preceding TCP packet did not arrive at, the process of the concerned UDP packet is delayed until the TCP packet that is delayed arrives at the terminal. With the above, the recovering method in the dual stream environment is realized.

Fourth Feature of i-Session System 100

The i-Session System 100 has a feature in a configuration used to sense whether or not the communication between the player terminal 200 on the transmitter side and the player terminal 200 on the receiver side is disconnected.

In more detail, the player terminal 200 on the transmitter side transmits at least one packet per one second to the player terminal 200 on the receiver side during the communication. The player terminal 200 on the transmitter side (sensing unit) always senses a packet generating timing. When the player terminal 200 on the transmitter side (empty packet generator) sensed that no packet is generated/transmitted within a predetermined threshold time (e.g., within 1 second), such terminal generates the packet whose command section is empty (in other words, the empty packet that does not contain the command contents) and then transmits this packet to the player terminal 200 on the receiver side. In this case, the journal section of this packet is not empty, and the journals of the UDP packets that are transmitted up to a point of this time are described in the journal section.

In contrast, the player terminal 200 on the receiver side considers that the communication with the player terminal 200 on the transmitter side is disconnected when such terminal does not receive the UDP packet within a predetermined time (e.g., 3 second).

When employing the foregoing configuration, the terminal on the receiver side can decide whether or not the above communication is disconnected even when the active sense message (the information transmitted to prevent that the sound is kept ringing in the terminal on the receiver side when the MIDI cable is disconnected) is not transmitted from the terminal on the transmitter side, unlike the prior art. In this fashion, a bandwidth in the TCP/IP communication can be used effectively by removing the active sense message in the terminal on the transmitter side. Here, a time defined in the above example, etc. (e.g., a minimum time interval within which the UDP packet is transmitted from the player terminal 200 on the transmitter side, etc. ) can be varied appropriately in answer to the design, and the like of the i-Session system 100.

An operation of each player terminal 200 implementing such i-Session system 100 will be explained with reference to FIG. 10 to FIG. 14 and others hereunder.

Packet Transmitting Operation

Figure 10:
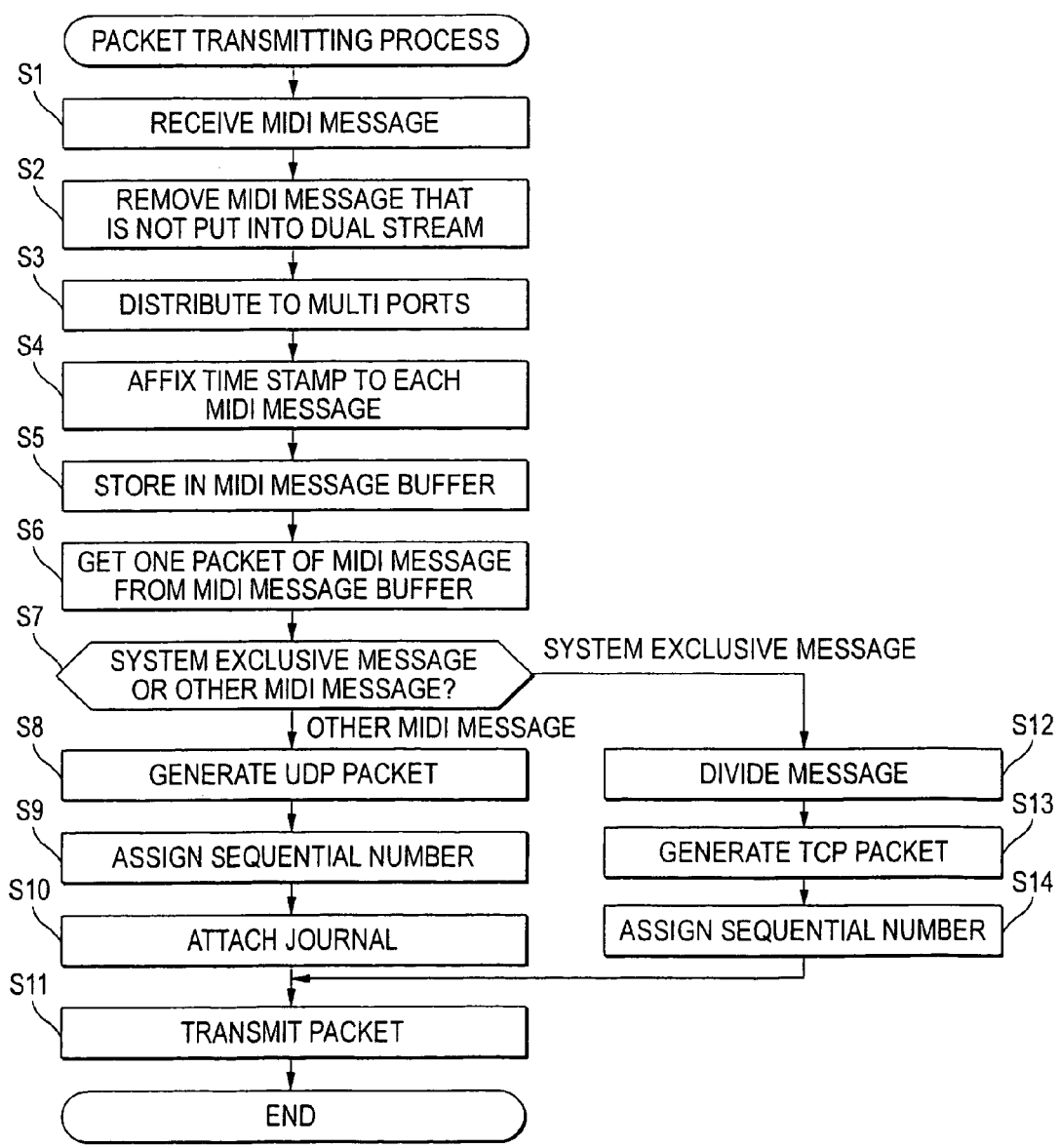
FIG. 10 is a flowchart showing a packet transmitting process according to the embodiment.

FIG. 10 is a flowchart showing a packet transmitting process executed by the MIDI transmitting portion of each player terminal 200. The MIDI transmitting portion provides a function of formulating the MIDI message supplied from the connected electronic musical instrument, or the like into packets and then transmitting this message to all player terminals 200 that take part in the session. The MIDI transmitting portion is implemented by operating the hardware resources (communication device, CPU, memory, and the like) incorporated into respective player terminals 200 and the softwares stored in the memory in cooperation.

The MIDI transmitting portion (inputting unit), when received the MIDI message from the electronic musical instrument via a MIDI driver (not shown), removes the MIDI message that is not put into both the TCP stream and the UDP stream, i.e., the MIDI message that is not put into the dual stream, from the received MIDI message (step S1→step S2). In this case, for example, timing clock, active sensing message, all-note-off message, message utilizing the running status, etc. may be listed as the removed MIDI message. It may be set/varied appropriately in answer to the application, etc. of the i-Session system 100 which MIDI message should be removed and which MIDI message should be formulated into the packets (i.e., setting conditions).

After the MIDI transmitting portion extracts only the MIDI message that is put into the dual stream (i.e., the MIDI message that meets the setting conditions) by removing the MIDI message that is not put into the dual stream as described above, such portion distributes the MIDI messages to the multi ports in accordance with the port dividing command that is given by an instructing device (not shown) (step S3). Now, in the present embodiment, the multi ports in which a plurality of usable ports are defined (see FIG. 11) are supposed. But the single port in which one port is used (see FIG. 12) maybe applied similarly.

After the MIDI transmitting portion executes such distribution, such portion affix a temporal time stamp to each MIDI message assigned to each port by referring to the i-Session timer and then store these messages sequentially in each MIDI message buffer (not shown) provided every port (step S4→step S5). Then, the MIDI transmitting portion gets collectively one packet of the MIDI message from the MIDI message buffer (step S6). In this case, since the system exclusive message out of the MIDI message cannot be transmitted together with other MIDI message at the same time, the MIDI transmitting portion gets collectively the system exclusive message and other MIDI message separately. Here, a quantity of data of the MIDI message packed into one packet is set appropriately in response to the application, etc. of the i-Session system 100.

Then, when the acquired MIDI message is the MIDI message except the system exclusive message (referred to as the "other MIDI message" hereinafter), the MIDI transmitting portion (packet generator) decides that the message should be put on the UDP stream to transmit and then generates the UDP packet by formulating the acquired other MIDI message into packets (step S7→step S8). The MIDI transmitting portion (first assigning unit and second assigning unit) assigns the sequential number representing the order of transmission of the UDP packets and the sequential number assigned to the preceding TCP packet to the UDP packet generated in this manner and then attaches the journal representing the history of the UDP packets that are transmitted up to now (step S9→step S10). Then, the MIDI transmitting portion (transmitter) transmits the packet to which the sequential numbers and the journal are added to all player terminals 200 that take part in the session (step S11). Then, the process is ended.

In contrast, when the acquired MIDI message is the system exclusive message, the MIDI transmitting portion (packet generator) decides that the message should be put on the TCP stream to transmit, then divides the message to include the acquired system exclusive message into one packet, and then generates the TCP packet (step S7→step S12→step S13).

After the MIDI transmitting portion (transmitter) generates the TCP packet containing the system exclusive message in this manner, such portion assigns the sequential number representing the order of transmission of the TCP packets (step S14), and then transmits the packet to all the player terminals 200 that takes part in the session (step S11). Then, the process is ended.

Packet Receiving Operation

Figure 13:
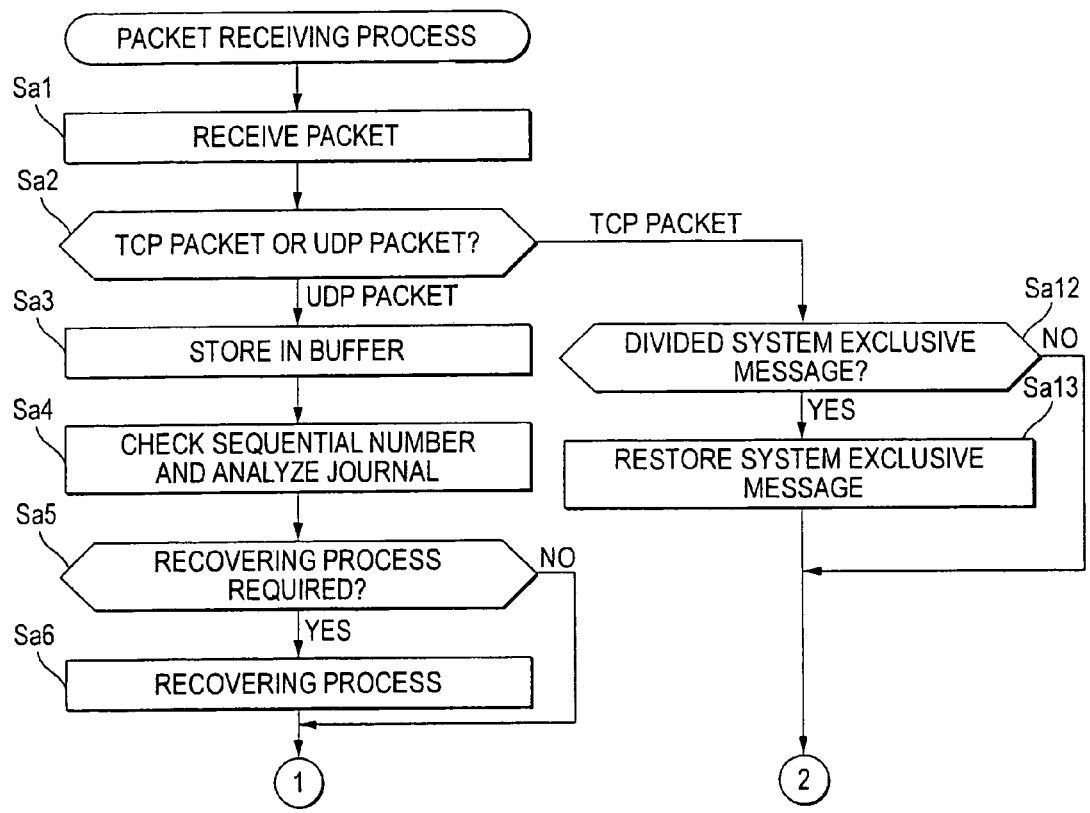
FIG. 13 is a flowchart showing a packet receiving process according to the embodiment.
Figure 14:
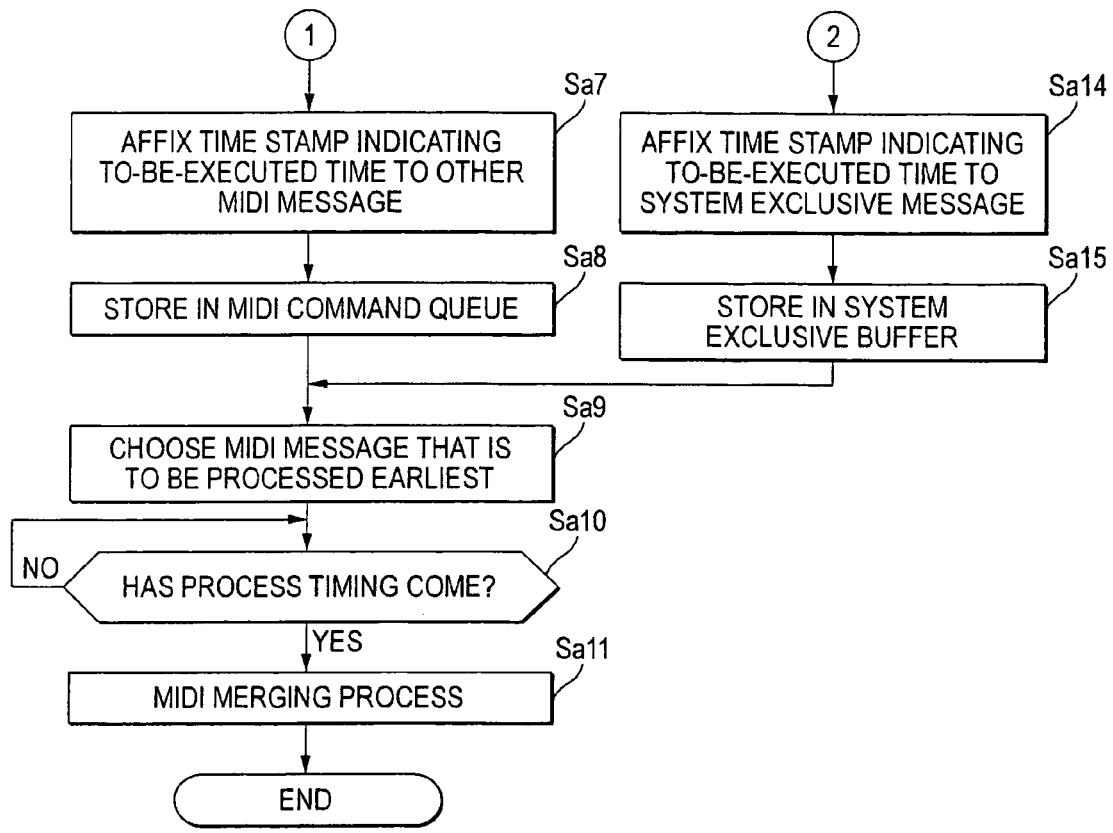
FIG. 14 is a flowchart showing a packet receiving process according to the embodiment.
Figure 15:
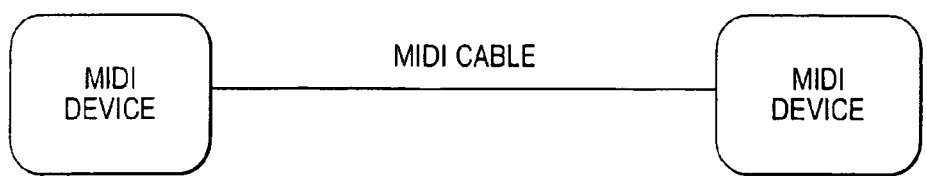
FIG. 15 is a view exemplifying a connection state between MIDI devices.

FIG. 13 and FIG. 14 are flowcharts showing the packet receiving process executed by the MIDI receiving portion of each player terminal 200. Here, the MIDI receiving portion provides a function of restoring the packets transmitted from other player terminals 200 into the MIDI message and merging the commands indicated by the restored MIDI messages at an appropriate timing. Like the MIDI transmitting portion, the MIDI receiving portion is implemented by operating the hardware resources (communication device, CPU, memory, and the like) incorporated into respective player terminals 200 and the softwares stored in the memory in cooperation.

When the MIDI receiving portion (receiver) receives the packet from other player terminals 200 via the Internet 350, or the like, such portion decides whether the received packet is the UDP packet or the TCP packet (step Sa1→step Sa2). When the MIDI receiving portion decided that the received packet is the UDP packet, such portion stores once the UDP packet in the buffer (step Sa2→step Sa3). The reason why the received packet is stored once in the buffer is that, when the TCP packet that must reached earlier does not arrive at, or the like, the process of the UDP packet must be delayed until the TCP packet arrives at.

The MIDI receiving portion (recovering unit) checks the sequential number assigned to the UDP packet, the sequential numbers assigned to the TCP packets received until now, and the like, and then analyzes the journal, or the like added to the UDP packet (step Sa4). If the MIDI receiving portion (recovering unit) decides that the recovering process is required, based on the analyzed result (step Sa5; Yes), such portion executes the recovering process to generate newly the lost UDP packet by using the journal, or the like (step Sa6). In this case, since the details of the recovering process are described above, explanation of such process is omitted.

After the MIDI receiving portion executed the recovering process, such portion affixes a time stamp indicating a to-be-executed time to the MIDI message and then stores in a MIDI command queue (step Sa7→step Sa8)

Figure 11:
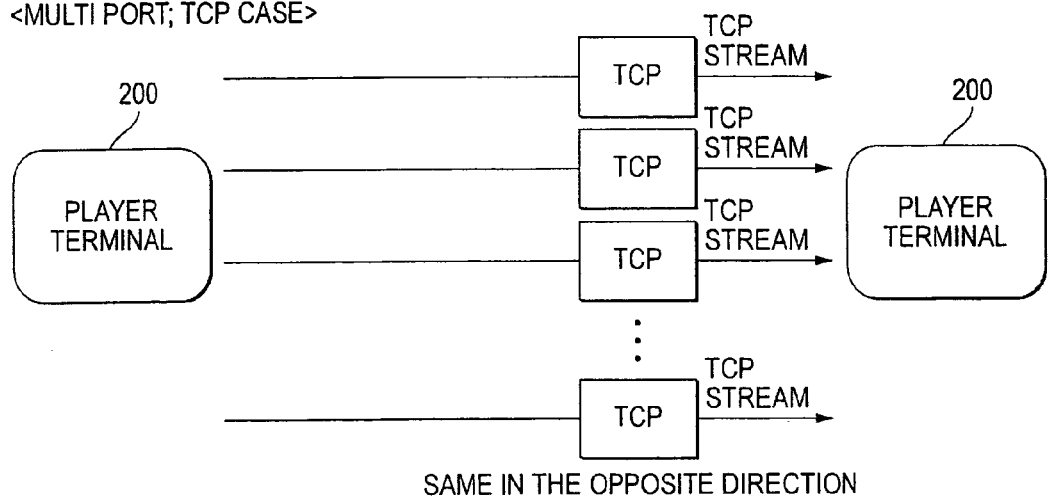
FIG. 11 is a view representing a concept of a multi port according to the embodiment.
Figure 12:
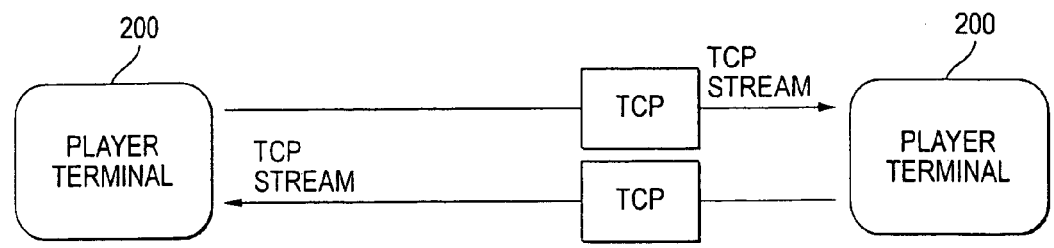
FIG. 12 is a view representing a concept of a single port according to the embodiment.

FIG. 13 FIG. 11 a concept a multi port according to the same embodiment a concept a single according to same in the opposite direction FIG. 12 case Order Pattern 2 wait for explaining to same embodiment according to IP protocol group application layer Internet layer network interface layer FIG. 14 according to the same embodiment flowchart showing a packet process according to the same embodiment Divided system exclusive message? (step Sa12) restore the system exclusive message (step Sa13)

affix a time stamp indicating a to-be-executed time to the system exclusive message (step Sa14) store in a system exclusive buffer (step Sa15)

choose the MIDI message that is to be processed earliest (step Sa9) Has a process timing come? (step Sa10) MIDI merging process (step Sa11)

As described above, according to the present embodiment, each player terminal participated in the session can transmits/receives the MIDI packets efficiently using the existing TCP and UDP without implementation of rich protocols such as RTP, RTCP and SDP.

By setting the sequence numbers and the journal that are applied to the TCP packets and UDP packets in the above-mentioned manner, the packet loss can be recovered by the simple method which supports the dual streams.

Since the functions of the player terminal 200 according to the present embodiment can be carried out by a computer program, the program can be distributed via a computer readable recording medium (CD-ROM and the like) storing the program and a communication network (Internet and the like). Of course, the player terminal 200 can be configured by an exclusive use apparatus where CPU, ROM and the like carrying out the above functions are installed.

What is claimed is:

1. A communication terminal into which a connection-oriented type protocol and a connectionless type protocol are incorporated, the communication terminal comprising:
   an inputting unit that inputs musical sound control data;
   a packet generator that classifies the input musical sound control data into first and second systems, respectively, and formulates the classified musical sound control data belonging to each first or second system into packets to generate musical sound control packets;
   wherein the packet generator formulates the musical sound control data, which meet setting conditions, out of the input musical sound control data into packets to generate the musical sound control packet; and
   a transmitter that transmits the musical sound control packet belonging to the first system to a destination terminal by utilizing the connection-oriented type protocol, and transmits the musical sound control packet belonging to the second system to the destination terminal by utilizing the connectionless type protocol.

2. The communication terminal according to claim 1, further comprising a first assigning unit that assigns a sequential number representing an order of transmission to all musical sound control packets that are transmitted by utilizing either the connection-oriented type protocol or the connectionless type protocol.

3. The communication terminal according to claim 2, wherein the first assigning unit assigns a sequential number for identifying the musical sound control packet and a sequential number, assigned to a preceding musical sound control packet that has already been transmitted by utilizing the connection-oriented type protocol, to each musical sound control packet transmitted by utilizing the connectionless type protocol.

4. The communication terminal according to claim 1, further comprising:
   a second assigning unit that assigns history information representing a history of the musical sound control packets that are precedingly transmitted to the destination terminal by utilizing the connectionless type protocol, to each musical sound control packet transmitted by utilizing the connectionless type protocol.

5. The communication terminal according to claim 2, further comprising:
   a second assigning unit that assigns history information representing a history of the musical sound control packets that are precedingly transmitted to the destination terminal by utilizing the connectionless type protocol, to each musical sound control packet transmitted by utilizing the connectionless type protocol.

6. The communication terminal according to claim 1, further comprising:
   an empty packet generator that generates an empty packet that does not contain command contents; and a sensing unit that senses a generation timing of each musical sound control packet that is transmitted by utilizing the connectionless type protocol, wherein the transmitter transmits the empty packet generated by the empty packet generator to the destination terminal by utilizing the connectionless type protocol when the generation timing of the musical sound control packet is not sensed by the sensing unit within a predetermined threshold time.

7. The communication terminal according to claim 1, wherein the connection-oriented type protocol includes TCP positioned in a transport layer, the connectionless type protocol includes UDP positioned in the transport layer, the musical sound control data includes a MIDI message, the musical sound control data belonging to the first or second system include a system exclusive message and other MIDI message, and the transmitter transmits the musical sound control packet, in which the system exclusive message is packed as a packet, to the destination terminal by utilizing the TCP and transmits the musical sound control packet, in which other MIDI message is packed as the packet, to the destination terminal by utilizing the UDP.

8. A communication terminal into which a connection-oriented type protocol and a connectionless type protocol are incorporated, the communication terminal comprising:

a receiver that receives a musical sound control packet transmitted from a destination terminal by utilizing the connection-oriented type protocol and the musical sound control packet transmitted from the destination terminal by utilizing the connectionless type protocol; and a recovering unit that recovers the musical sound control packet transmitted by utilizing the connectionless type protocol, based on a sequential number representing an order of transmission assigned to all musical sound control packets transmitted by utilizing respective protocols and history information attached to the musical sound control packet transmitted by utilizing the connectionless type protocol.

9. A method of communications between communication terminals using a connection-oriented type protocol and a connectionless type protocol, the method comprising:

inputting musical sound control data;

classifying the input musical sound control data into first and second systems, respectively;

formulating the classified musical sound control data belonging to each first or second system into packets by formulating musical sound control data which meet setting conditions out of the input musical sound control data into packets to generate musical sound control packets;

transmitting the musical sound control packet belonging to the first system by utilizing the connection-oriented type protocol; and transmitting the musical sound control packet belonging to the second system by utilizing the connectionless type protocol.

10. A computer readable recording medium storing a program that causes a computer running the program to execute a procedure according to the method of claim 9.

11. A method of communications between communication terminals using a connection-oriented type protocol and a connectionless type protocol, the method comprising:

receiving a musical sound control packet by utilizing the connection-oriented type protocol and the musical sound control packet by utilizing the connectionless type protocol; and a recovering unit that recovers the musical sound control packet transmitted by utilizing the connectionless type protocol, based on a sequential number representing an order of transmission assigned to all musical sound control packets transmitted by utilizing respective protocols and history information attached to the musical sound control packet transmitted by utilizing the connectionless type protocol.

12. A computer readable recording medium storing a program that causes a computer running the program to execute a procedure according to the method of claim 11.

* * * * *